United States Patent [19]

Nazirizadeh et al.

[11] Patent Number: 4,729,974
[45] Date of Patent: Mar. 8, 1988

[54] MAGNESIA AND SPINEL REFRACTORY BRICK

[75] Inventors: Morteza Nazirizadeh; Herbert Naefe, both of Wiesbaden, Fed. Rep. of Germany

[73] Assignee: Didier-Werke AG, Wiesbaden, Fed. Rep. of Germany

[21] Appl. No.: 809,074

[22] Filed: Dec. 13, 1985

[30] Foreign Application Priority Data

Dec. 13, 1984 [DE] Fed. Rep. of Germany ....... 3445482

[51] Int. Cl.$^4$ ............................................. C04B 35/02
[52] U.S. Cl. .................................... 501/120; 501/121; 501/108
[58] Field of Search ............... 501/120, 119, 118, 109, 501/108, 121

[56] References Cited

U.S. PATENT DOCUMENTS

| | | | |
|---|---|---|---|
| 2,063,543 | 12/1936 | Erdmann | 501/119 |
| 3,141,790 | 7/1964 | Davies | 501/109 |
| 3,378,383 | 4/1968 | Van Dreser | 501/109 |
| 3,473,939 | 10/1969 | Mayberry et al. | 501/117 |
| 4,039,343 | 8/1977 | Stein et al. | 106/59 |
| 4,126,479 | 11/1978 | Videtto et al. | 501/120 OR |
| 4,253,410 | 3/1981 | Laux et al. | 110/331 |
| 4,265,845 | 5/1981 | Eschner | 264/63 |
| 4,389,492 | 6/1983 | Tanemura | 501/112 |
| 4,432,536 | 2/1984 | Coordes et al. | 266/280 |
| 4,436,680 | 3/1984 | Eschner et al. | 264/60 |
| 4,468,780 | 8/1984 | Schellberg et al. | 373/75 |
| 4,479,777 | 10/1984 | Simon | 432/179 |

FOREIGN PATENT DOCUMENTS

| | | | |
|---|---|---|---|
| 3023229 | 1/1982 | Fed. Rep. of Germany . | |
| 825908 | 12/1959 | United Kingdom | 501/120 |
| 1296860 | 11/1972 | United Kingdom | 501/105 |

*Primary Examiner*—Mark L. Bell
*Assistant Examiner*—Karl Group
*Attorney, Agent, or Firm*—Nils H. Ljungman

[57] ABSTRACT

The invention relates to a refractory brick on the basis of sintered magnesium oxide and $MgO.Al_2O_3$ spinel and possibly up to three percent by weight of customary impurities. Such customary impurities are primarily $CaO$, $Fe_2O_3$ and $SiO_2$, which are included as impurities in the MgO used in the production of the spinel. The refractory brick according to the invention is characterized by the fact that it has a refractoriness under load of more than 1740° C. and a compression settling of −3 to −5% at 1400° C. after 24 hours under a load of $0.2N/mm^2$. The refractory brick according to the invention exhibits the advantage that as a result of the combination of its characteristics of gas permeability, pore volume, refractoriness under load and compression settling, it is particularly well suited for use in rotary hearth furnaces for the cement industry.

5 Claims, No Drawings

MAGNESIA AND SPINEL REFRACTORY BRICK

BACKGROUND OF THE INVENTION

1. Field of the Invention

The invention relates to refractory shapes in general and, more particularly, to an improved refractory brick which exhibits resistance to temperature change and good pressure flexibility. The refractory brick comprises sintered magnesium oxide and $MgO \cdot Al_2O_3$ spinel, wherein the magnesium oxide content is between about 82 to 90 percent by weight and the aluminum oxide content is between about 10 to 18 percent by weight, and a content of up to about 3 percent by weight of customary impurities.

2. Description of the Prior Art

While pure magnesium oxide bricks were previously used, specifically for lining furnaces in the cement industry, over the past several decades it has been a long-standing goal in the art to develop refractory construction materials for open-hearth furnaces and to produce high-quality basic bricks, specifically with improved resistance to temperature changes and slag, and with excellent refractory qualities. The results of this on-going search have included basic bricks containing chromium and sintered dolomite products.

In the beginning of the 1970's, further improvements were made with magnesite-chrome bricks by the development of the high-temperature firing technology, specifically with regard to the physical-ceramic properties of these bricks.

One example of such bricks can be had from U.S. Pat. No. 4,039,343 issued to Stein, et al. on Aug. 2, 1977, entitled "Improved Performance Direct Bonded Basic Refractory Brick And Method Of Manufacture", the contents of which are incorporated herein by reference. This patent teaches a refractory shape having about 40 to about 75 percent by weight high purity magnesite, about 25 to about 60 percent by weight chrome ore, and about 0.5 to about 10 percent by weight chromic oxide powder. Such dolomite and magnesite-chrome bricks are used in the cement industry, particularly in stable, supported areas of the sinter zone of a rotary hearth furnace.

However, the problems have not been solved with respect to the reduction of premature wear in these zones, in which stable conditions do not prevail. Such zones include those areas prior to and immediately after the primary sintering zone. With magnesite-chrome bricks, moreover, the hexavalent chromium represents a pollution problem. A variety of techniques have been employed to improve the wear characteristics of the lining in steel-making furnaces and the like. For example, U.S. Pat. No. 4,468,780, issued to Schellberg, et al. on Aug. 28, 1984, entitled "Method Of Lining A Steel-Making Furnace", the contents of which are incorporated herein by reference, teaches a method of lining a steel-making furnace with bricks to form a first lining and at least a portion of a wall area of a furnace with bricks and/or a water cooling box to form a second lining. An example of the use of dolomite bricks and bauxite bricks as a refractory fireproof inner liner in a molten iron-containing vessel can be had from U.S. Pat. No. 4,432,536, issued to Coordes, et al. on Feb. 21, 1984, entitled "Molten Iron Containing Vessel With Improved Refractory Lining", the contents of which are incorporated herein by reference. Further developments led to the creation of basic refractory bricks, which essentially consist of sintered magnesium oxide as well as $MgO \cdot Al_2O_3$ spinel (so-called genuine spinel). For applications in the cement industry, a pre-synthesized spinel provides a particularly advantageous constituent for the manufacture of bricks. The material characteristics of such magnesium oxide spinel bricks can offer significant advantages over conventional magnesite chrome products. Thus, for example, resistance to alkalis as well as higher degrees of refractoriness can be achieved. Practical experience has shown that, to some extent, and particularly under changing conditions, the mechanical properties of these bricks are not sufficient to withstand the alternating stresses which occur and which cause the formation of cracks and premature wear of the bricks. An example of such spinel magnesia bricks can be had in U.S. Pat. No. 4,389,492, issued to Tanemura on June 21, 1983, entitled "Spinel-Magnesia Basic Brick", the contents of which are incorporated herein by reference.

In order to improve the resistance to wear of the lining of rotary hearth furnaces used in the cement industry, it has been suggested, as in German Laid Open patent application No. DE-OS No. 30 23 229, to use a compound lining in order to compensate for the severe strains incurred by such furnaces. Such compound linings typically comprise the use of magnesium oxide or magnesite-chrome bricks with so-called pyroplastic properties, which are laid in combination with so-called hard core bricks. For example, the two grades of brick can be laid in a checkerboard pattern, whereby the magnesium oxide or magnesium oxide chromium bricks form a matrix, between which the refractory hard core bricks are inserted as appropriate. However, such a lining does not lead to a uniform reduction of stresses. The bricks tend to work their way out of position, and the so-called pyroplastic bricks have only relatively low refractory characteristics. The use of a checkerboard pattern of bricks also requires that an inventory of at least two different refractory grades must be maintained. This obviously results in a significantly higher cost for the lining itself, as well as complications in both the repair of the damaged lining and the maintenance of a proper inventory.

Refractory bricks which are subjected to severe variations in temperature and which must simultaneously exhibit high resistance to infiltration and chemical corrosion must therefore exhibit suitable characteristics with respect to gas permeability (GD), pore volume, refractoriness under load (DFB) and the compression settling (DFL).

Heretofore, under those techniques conventionally utilized, some of the above-mentioned characteristics have been met by the available refractory bricks. However, a combination of all four characteristics has not yet been achieved in a single refractory brick. Table I shows values for the above-mentioned prior art characteristics for bricks. In Table I, MA represents magnesium oxide spinel brick and MC represents magnesite-chrome brick.

TABLE I

|  |  | MA 1 | MA 2 | MC 1 | MC 2 |
|---|---|---|---|---|---|
| $P_v$ | percent | 19 | 17.5 | 18 | 16.5 |
| GD | Nanoperm | 5 | 4 | 15 | 20 |
| DFB | ta °C. | 1550 | >1740 | 1600 | >1740 |
| DFL | percent compression settling at 1400° C. | −5 | −1 | 0.5 | 0.3 |

OBJECTS OF THE INVENTION

It is therefore an object of the present invention to provide an improved magnesium oxide spinel brick which displays good gas permeability, pore volume, refractoriness under load, and compression settling characteristics.

It is a further object of the present invention to provide an improved magnesium oxide spinel brick which can withstand the stresses caused by pressure changes, and simultaneously demonstrate improved resistance to infiltration and chemical corrosion.

SUMMARY OF THE INVENTION

The invention provides a refractory brick which exhibits advantages that, as a result of the combination of its characteristics of gas permeability, pore volume, refractoriness under load and compression settling, make it particularly well-suited for use in rotary hearth furnaces. The invention provides a refractory brick comprising sintered magnesium oxide and $MgO.Al_2O_3$ spinel and can include up to 3 percent by weight impurities. The refractory brick of this invention is characterized by the fact that it has a refractoriness under load of more than 1740° C. and a flow or settling under compression of $-3$ to $-5\%$ at 1400° C. after 24 hours under a load of 0.2 $N/mm^2$. The flow under compression results in a decrease of the dimension in the direction of the compressive load of about 3% to about 5%. Preferably, the refractory brick of this invention utilizes sintered magnesium oxide having a grain of less than 0.09 mm. Furthermore, this refractory brick has a gas permeability of less than 5 Nanoperm with a total porosity of 15 to 20 volume percent. The refractory brick of this invention is a product with a small-pore, and filament-like interlocking structure. The porosity of this brick can be determined by a hydrostatic test method and is approximately 5 to 15 volume percent.

DETAILED DESCRIPTION OF THE INVENTION

The invention provides a refractory brick comprising sintered magnesium oxide and $MgO.Al_2O_3$ spinel. The MgO content is between about 82 to 90 percent by weight and the $Al_2O_3$ content is between about 10 to 18 percent by weight. The refractory brick can have a content of up to about 3 percent by weight of impurities. The refractory brick has a refractoriness under load of more than 1740° C. and a compression settling of $-3$ to $-5$ percent at 1400° C. after 24 hours of operation and a load of 0.2 $N/mm^2$. Preferably, the sintered magnesium oxide has a grain of less than 0.09 mm. Additionally, the refractory brick as described above has a gas permeability of less than 5 Nanoperm with a total porosity of 15 to 20 volume percent. A refractory brick displaying the above-identified characteristics and comprising the afore-mentioned constituents can be produced through the conventional steps of mixing the refractory material, compacting the mixture, and drying and/or firing the compacted mixture. A general discussion of the method for forming such refractory materials can be had from previously-mentioned U.S. Pat. No. 4,039,343. A further discussion of the production of fire resistant material can be had from U.S. Pat. No. 4,436,680 issued to Eschner, et al. on Mar. 13, 1984, entitled "Process For Producing Granular, Fire-Resistant Material", the contents of which are incorporated herein by reference.

With the above-mentioned primary materials and proper control of the firing of the brick until the required physical characteristics are obtained, the result is a product with a small-pore, filament-like and interlocking structure. At a total porosity of 15 to 20 volume percent, a gas permeability of less than 5 Nanoperm is achieved. The porosity which can admit a flow, which can be determined by the hydrostatic test method, is approximately 5 to 15 volume percent.

The refractory brick of the invention is certainly dependent on the special granular structure of the primary materials, but obviously there are other influences, about the exact causes of which we can only speculate. The influence of the increased amount of CaO can obviously make a significant contribution to the stabilization of the overall structure. It turns out that specific improvements are achieved if a magnesium oxide sinter is used with a $CaO/SiO_2$ ratio of more than 2.5, and a CaO content between 1.5 and 3.5 percent by weight.

Because of the known chemical-physical conditions, the calcium oxide is present in the refractory brick as dicalcium and tricalcium silicate, calcium aluminate and calcium aluminate ferrite, and also as CaO dissolved in the solid phase.

A refractory brick according to the invention is characterized by a high resistance to temperature changes, and by a particularly good pressure flexibility. Pressure flexibility in this case means the ability of the brick to withstand mechanical strains, especially sudden changes of pressure, as a result of a certain deformability. The improved deformability makes it possible for the bricks to spontaneously relieve stress peaks in the lining, which significantly increases their strength and durability.

Depending on the primary materials available, the molding pressure and the firing temperature for the manufacture of the refractory brick described by the invention are to be selected so that the crystallization and mineral phase formation are controlled in such a way that the fired brick has the specified physical characteristics.

The invention is explained in more detail below, by means of examples and comparative examples:

Sintered magnesium oxide and $MgO.Al_2O_3$ spinel with a chemical composition as indicated in Table II, were used for the manufacture of the refractory bricks. The granular refractory material was mixed as usual, with the addition of binder, whereby the material was added in grain sizes 2 to 4 mm, 1 to 4 mm, 1 to 2 mm, 0.09 to 1 mm and less than 0.09 mm(See Table III). The magnesia sinter having a grain size of less than 0.09 mm constitutes about 35 to about 42 percent by weight, preferably about 37 to 40 percent by weight of the starting materials. Bricks were manufactured from the mixture by molding at a pressure of 110 $N/mm^2$ and firing. The characteristics of the bricks are indicated in Table IV.

The bricks manufactured in accordance with the invention, Examples 1 and 2, have a small-pore, filament-like and interlocking structure in the fine-grain range of the granulation, characterized by grain sizes of less than 0.09 mm. This is in connection with the low gas permeability achieved, which has a favorable effect on the increase in the resistance to infiltration. The brick exhibits sufficiently high strength and high refractoriness under load, and at the same time a relatively high value for compression settling at 1400° C. In the context of the invention, this characteristic is to be considered in connection with the desired improved deformability and resistance of the bricks to changes of pressure.

In Comparative Example A, with a relatively low grain fraction below 0.09 mm according to the prior art, a high strength is achieved, but it is accompanied by a structure which is not suitable for the achievement of low gas permeability and deformability. With a proportion of the grain fraction below 0.09 mm of more than 42 percent by weight, there is a danger of the formation of lamination cracks during molding. In Comparative Examples B and C, because of the Type B sintered magnesium oxide with a low CaO content, the refracto-

TABLE II

COMPOSITION OF STARTING MATERIALS BY PERCENT, EXCEPT CaO/SiO$_2$ RATIO

| Percent by Weight | SiO$_2$ | Al$_2$O$_3$ + Fe$_2$O$_3$ | CaO | MgO | CaO/SiO$_2$ |
|---|---|---|---|---|---|
| Magnesia sinter a | 0.48 | 0.29 | 2.39 | 96.8 | >2.5 |
| Magnesia sinter b | 4.53 | 2.15 | 1.54 | 91.8 | <2.5 |
| Magnesia sinter c | 0.11 | 0.17 | 1.27 | 98.2 | >2.5 |
| Magnesia sinter d | 0.08 | 0.17 | 0.61 | 99.1 | >2.5 |
| Spinel | 0.25 | 66.2 | 0.25 | 0.4 | 32.8 |

TABLE III

| PROPORTIONS OF STARTING MATERIALS | 1 | 2 | A | B | C | D | E |
|---|---|---|---|---|---|---|---|
| Magnesia sinter type | a | a | a | b | b | c | d |
| 0.09–4 mm (in 1%) | 46 | 50 | 57 | 46 | 57 | 46 | 46 |
| 0.09 mm (in 1%) | 39 | 35 | 28 | 39 | 28 | 39 | 39 |
| Spinel |  |  |  |  |  |  |  |
| 0.09–4 mm (in 1%) | 15 | 15 | 15 | 15 | 15 | 15 | 15 |
| Firing °C. | 1550 | 1550 | 1550 | 1400 | 1550 | 1750 | 1750 |

TABLE IV

| CHARACTERISTICS OF FIRED BRICKS BY MIXTURES | | 1 | 2 | A | B | C | D | E |
|---|---|---|---|---|---|---|---|---|
| CaO (total) | Wt. % | 2.0 | 2.0 | 2.0 | 1.5 | 1.5 | 1.1 | 0.6 |
| Crude density | g/cm$^3$ | 2.90 | 2.92 | 2.95 | 2.85 | 2.90 | 3.00 | 2.95 |
| Total porosity | % | 18.7 | 18.4 | 17.3 | 19.2 | 17.8 | 16.2 | 17.5 |
| Cold compression strength | N/mm$^2$ | 50 | 50 | 55 | 55 | 60 | 80 | 45 |
| Gas permeability (DIN 51058) | npm | 3 | 5 | 15 | 5 | 20 | 12 | 4 |
| Refractoriness under load (DIN 51064, Sh. 1) | ta °C. | >1740 | >1740 | >1740 | 1550 | >1550 | >1740 | >1740 |
| Compression settling (%) 1400° C., 0.2 N/mm$^2$ (DIN 51053, Sh. 2) | 24 h | −4.5 | −3.5 | −2 | −5.5 | −2 | −1 | −1 | riness under load decreases, and the desired deformability at high temperatures is not achieved. Comparative Examples D and E show that with a high CaO/SiO$_2$ ratio and a low CaO content of magnesium oxide sinter, a sufficiently high refractoriness under load is achieved, but not the desired compression settling.

Examples 1 and 2 show, in juxtaposition to the Comparative Examples A to E, that the bricks according to the invention have a favorable deformation behavior with a high refractoriness under load, specifically a favorable deformation behavior to withstand pressure changes during operation.

The MgO.Al$_2$O$_3$ spinel used for the manufacture of the bricks according to the invention comprise, preferably 82 to 90 percent by weight MgO and 10 to 18 percent by weight Al$_2$O$_3$, as well as up to 3 percent by weight customary impurities. Such customary impurities are primarily CaO, Fe$_2$O$_3$ and SiO$_2$, which are primarily included as impurities in the MgO used in the production of the spinel.

The above-mentioned refractoriness under load is determined according to DIN Standard 51064, Sheet 1. The compression flow or settling behavior is determined according to DIN Standard 51053, Sheet 2. Both DIN Standards are incorporated herein by reference as if fully set forth in the text hereof.

The invention as described hereinabove in the context of the preferred embodiments is not to be taken as limited to all of the provided details thereof, since modifications and variations thereof may be made without departing from the spirit and scope of the invention.

What is claimed is:

1. An improved cement kiln refractory shape for lining cement kilns, said refractory shape comprising sintered magnesium oxide and MgO.Al$_2$O$_3$ spinel, said refractory shape having high resistance to temperature changes and good pressure flexibility;

said refractory shape consisting essentially of:
  between about 82 to about 90 percent by weight of magnesium oxide;
  between about 10 to about 18 percent by weight Al$_2$O$_3$; and
  a content of up to about 3 percent by weight impurities; said impurities comprising CaO, Fe$_2$O$_3$ and SiO$_2$;
said refractory shape being fired at a temperature of between about 1450° C. and about 1600° C.;
said refractory shape when fired having a refractoriness under load of more than 1740° C. and a change of dimension under compression at a load of 0.2 N/mm$^2$ of about −3 to about −5 percent at 1400° C. after 24 hours;

said refractory shape being manufactured from the following starting materials:
a magnesium oxide sinter; and
an $MgO \cdot Al_2O_3$ spinel; wherein about 35 to about 42 percent by weight of said starting materials is magnesium oxide sinter having a grain size of less than about 0.09 mm;
said starting magnesium oxide sinter having a CaO content between about 1.5 and about 3.5 percent by weight;
said starting magnesium oxide sinter having a $CaO/SiO_2$ ratio by weight of more than about 2.5.

2. The improved refractory shape according to claim 1 wherein said refractory shape has a gas permeability of less than about 5 Nanoperm with a total porosity of about 15 to about 20 volume percent.

3. The improved refractory shape according to claim 1 wherein the magnesium oxide sinter of the mixture of starting materials which has a grain size of less than about 0.09 mm comprises between about 37 to about 40 percent by weight of the starting mixture.

4. The improved refractory shape according to claim 1 wherein the sintered magnesium oxide content of the refractory shape is about 85 percent by weight and the $MgO \cdot Al_2O_3$ spinel content of the refractory shape is about 15 percent by weight.

5. The improved refractory shape according to claim 3 wherein the sintered magnesium oxide content of the refractory shape is about 85 percent by weight and the $MgO \cdot Al_2O_3$ spinel content of the refractory shape is about 15 percent by weight.

* * * * *